United States Patent [19]

Masaki

[11] Patent Number: 4,538,884

[45] Date of Patent: Sep. 3, 1985

[54] ELECTRO-OPTICAL DEVICE AND METHOD OF OPERATING SAME

[75] Inventor: Tatsuo Masaki, Tokyo, Japan

[73] Assignee: Canon Kabushiki Kaisha, Tokyo, Japan

[21] Appl. No.: 396,051

[22] Filed: Jul. 7, 1982

[30] Foreign Application Priority Data

Jul. 10, 1981 [JP] Japan ................................ 56-108722
Aug. 25, 1981 [JP] Japan ................................ 56-133149
Aug. 25, 1981 [JP] Japan ................................ 56-133150
Aug. 26, 1981 [JP] Japan ................................ 56-134448
Aug. 31, 1981 [JP] Japan ................................ 56-137163

[51] Int. Cl.³ ............................................. G02F 1/135
[52] U.S. Cl. ................................... 350/361; 350/342
[58] Field of Search ................................ 350/361, 342

[56] References Cited

U.S. PATENT DOCUMENTS

| | | | |
|---|---|---|---|
| 3,840,695 | 10/1974 | Fischer | 350/339 F |
| 3,863,332 | 2/1975 | Leupp et al. | 350/344 X |
| 4,005,929 | 2/1977 | Adams et al. | 350/342 X |
| 4,191,452 | 3/1980 | Grinberg et al. | 350/342 |
| 4,368,386 | 1/1983 | Huignard et al. | 350/342 X |

Primary Examiner—John K. Corbin
Assistant Examiner—Lynn Vandenburgh Kent
Attorney, Agent, or Firm—Fitzpatrick, Cella, Harper & Scinto

[57] ABSTRACT

An electro-optical device, provided with a liquid crystal layer and a photoconductive layer, for converting a light input image into a projection image is characterized in that (A) a shading layer having a plurality of penetrating holes corresponding to picture elements and (B) a plurality of reflectors, separate from one another, facing the penetrating holes one by one through a light-transmittable insulating layer being contact with the shading layer are laid between the liquid crystal layer and the photoconductive layer. An electro-optical device comprising a liquid crystal layer is provided with counter electrodes at least one of which is composed of plural stripes of electrodes. In the devices, images can be produced by applying a voltage in the opposite direction of rectification with applying a writing light input signals and erased by applying a voltage in the forward direction of rectification.

13 Claims, 24 Drawing Figures 2b 9a 9b 9c 8

2b 9a 9b 9c 8

2b 9a 9b 9c 8

ELECTRO-OPTICAL DEVICE AND METHOD OF OPERATING SAME

BACKGROUND OF THE INVENTION

1. Field of the Invention

This invention relates to an electro-optical device for converting a light input image into a projection image by its photoelectric effect and to the method of operating the device.

2. Description of the Prior Art

A device called a liquid crystal light valve has hitherto been known as said type of electro-optical device. As an example, European Patent Application Publication No. 0023796 (published Feb. 11, 1981) disclosed a liquid crystal light valve having a multilayer structure consisting of a liquid crystal layer, a dielectric mirror, and a photoresponsive layer sandwiched between two transparent electrodes. In such a liquid crystal light valve, the dielectric mirror is an element necessary to reflect projection light incident from the liquid crystal side, for preventing the light from reaching the photoconductive layer.

For the dielectric mirror, multilayer films are used which comprise, for example, ZnS, $Na_3AlF_6$, $MgF_2$, $TiO_2$, or $SiO_2$. In order to prepare a dielectric mirror capable of reflecting all the visible rays, at least about 15-layer lamination is necessary together with a precise control of thickness for each layer. This requires considerably advanced production techniques. Even with a dielectric mirror produced in such a way, perfect reflection of the projection light cannot be achieved in practice, needing additional preparation of a light-absorbing layer between the photoconductive layer and the dielectric mirror, to compensate the function of the mirror. Thus, such conventional liquid crystal light valves do not have desired sufficient functions, structures thereof are complicated, and production thereof is laborious and expensive.

In addition, these light valves utilize the birefringence effect, so that their control voltage range is narrow, that is, a considerably precise control of the operational voltage is required for obtaining projection images of the desired shade. Projection images uniformly shaded or multicolored are difficult to form with these light valves.

These light valves utilize the dynamic scattering effect, the phase transfer effect, or the field-controlled birefringence effect as an electrooptical effect of liquid crystals. In order to form projection images (those for a projection purpose) in the liquid crystal layer by utilizing such effect or to erase these images, the light valve needs to be provided with at least two transparent conductive films (electrodes) facing each other through the above-mentioned liquid crystal layer and photoconductive layer. An example of methods of forming and erasing projection images in such light valves is described in Appl. Phys. Letter, 34 450 (1979). According to this method, erasing a projection image is carried out by applying a voltage opposite in polarity to that for forming a projection image, between counter electrodes.

The formation of TV-compatible dynamic images by the above-mentioned conventional method involves the following disadvantage. Since the voltage application between the counter electrodes is continued until completion of forming a projection based on the input of one frame of TV-compatible light signals, the formation of a projection image based on the input of the next frame of light signals must be delayed to the moment when erasure of the preceeding frame of projection image is finished.

Another disadvantage of the conventional method is that it is inherently impossible for the method to address optional sites, for instance, an optional line or row, and form a projection image, based on the input of its light signals, by the voltage control.

SUMMARY OF THE INVENTION

An object of this invention is to provide an electro-optical device, generally called a "liquid crystal light valve", free from such disadvantages as mentioned above, which has a simple structure and satisfactory functions.

Another object of this invention is to provide an electro-optical device capable of giving high resolution color displays.

A further object of this invention is to provide an electro-optical device, generally called a "liquid crystal light valve", that is d.c.-workable, and easily displays dynamic images and/or multicolored images.

A still further object of this invention is to provide a method of operating an electro-optical device, generally called a "liquid crystal light valve", that is d.c.-workable, and easily displays dynamic images.

According to one aspect of the present invention, there is provided an electro-optical device, provided with both a liquid crystal layer and a photoconductive layer, for converting a light input image into a projection image by a photoelectric effect characterized in that (A) a shading layer having a plurality of penetrating holes corresponding to picture elements and (B) a plurality of reflectors, separate from one another, facing said penetrating holes one by one through a light-transmittable insulating layer being in contact with said shading layer are laid between the liquid crystal layer and the photoconductive layer.

According to another aspect of the present invention, there is provided an electro-optical device, provided with both a liquid crystal layer and a photoconductive layer, for converting a light input image into a projection image by a photoelectric effect characterized in that the photoconductive layer has a rectifying property and (A) a shading layer having a plurality of penetrating holes corresponding to picture elements and (B) a plurality of reflectors, separate from one another, facing said penetrating holes one by one through a light-transmittable insulating layer being in contact with said shading layer are laid between the liquid crystal layer and the photoconductive layer.

According to a further aspect of the present invention, there is provided an electro-optical device, provided with both a liquid crystal layer and a photoconductive layer, for converting a light input image into a projection image by a photoelectric effect characterized in that the photoconductive layer has a rectifying property and (A) an analyser, (B) a shading layer having a plurality of penetrating holes corresponding to picture elements, and (C) a plurality of reflectors, separate from one another, facing said penetrating holes one by one through a light-transmittable insulating layer being in contact with said shading layer are laid between the liquid crystal layer and the photoconductive layer.

According to still another aspect of the present invention, there is provided an electro-optical device, provided with at least a liquid crystal layer and a photoconductive layer between counter electrodes, for converting a light input image into a projection image by a photoelectric effect characterized in that at least one of the counter electrodes consists of plural stripes of electrodes separate from one another.

According to a still further aspect of the present invention, there is provided a method of operating an electro-optical device provided with both a liquid crystal layer and a photoconductive layer having a rectifying property, for converting a light input image into a projection image by a photoelectric effect which comprises (A) a step of forming a projection image due to the liquid crystal layer by applying a d.c. voltage in the opposite direction of rectification due to the photoconductive layer and irradiating the photoconductive layer with writing light input signals, and (B) a step of erasing the projection image by applying a voltage in the forward direction of rectification due to the photoconductive layer.

DESCRIPTION OF THE PREFERRED EMBODIMENTS

Figure 1:
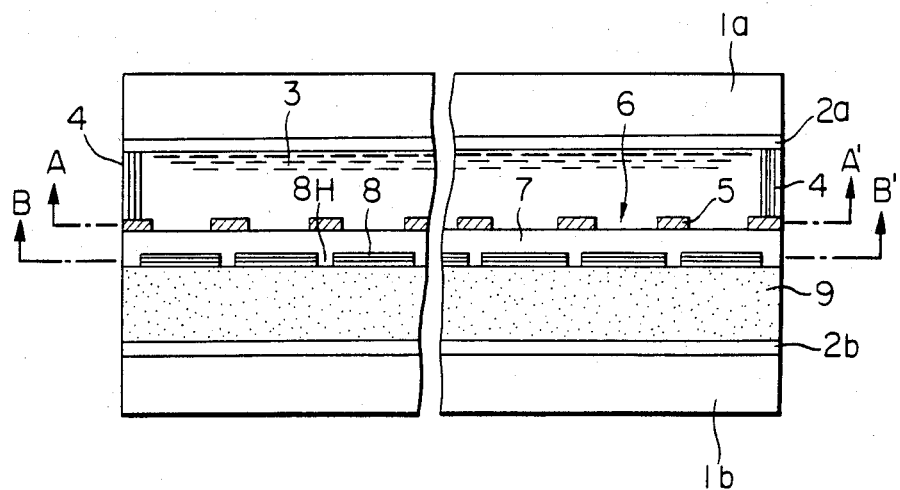
FIGS. 1 to 6 are schematic cross-sectional views of embodiments of the present device.

Referring to the Drawings, this invention is described in detail.

Figure 2:
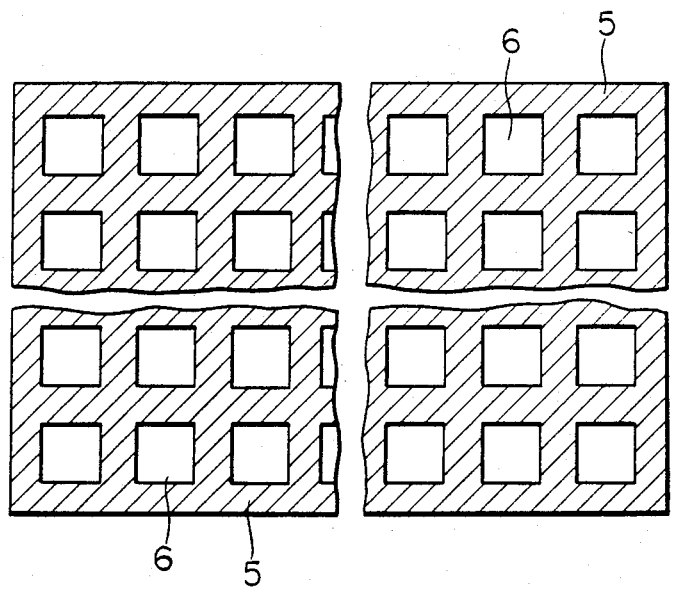

FIG. 1 is a schematic cross-sectional view of the first embodiment, wherein 1a and 1b are each a transparent substrate made of a glass or resin plate; 2a and 2b are each a transparent electrode made of a thin film of, for example, $SnO_2$ or $In_2(Sn)O_3$; 3 is a liquid crystal layer and 4 is a spacer serving to seal the liquid crystal layer 3 as well as to adjust the thickness of the layer to a given value. The spacer 4 is usually made of a binder resin mixed with alumina powder or pulverized glass fiber. 5 is a shading layer of carbon or a metal of approximately 500 Å to 2 μm thick formed by a deposition method. Shading layer 5 has a plane form, of which a cross-section taken along line A-A' in FIG. 1 is shown in FIG. 2, and shading layer 5 is provided with a number of penetrating holes 6 arranged like a lattice. One of these penetrating holes 6 corresponds to one picture element of a projection image. The shape of holes 6 is optional, being not limited to the rectangular form shown in FIG. 2 as an example. Further, 7 in FIG. 1 is a light-transmittable insulating layer made of a ferroelectric film such as SiC or $Si_3N_4$ film formed by the electric discharge-decomposition process or $SiO_2$, $PbTiO_3$, or PLZT film formed by a sputtering vacuum deposition process. The thickness of the insulating layer 7 is desirably in the range of 1000 Å to 5 μm.

Figure 3:
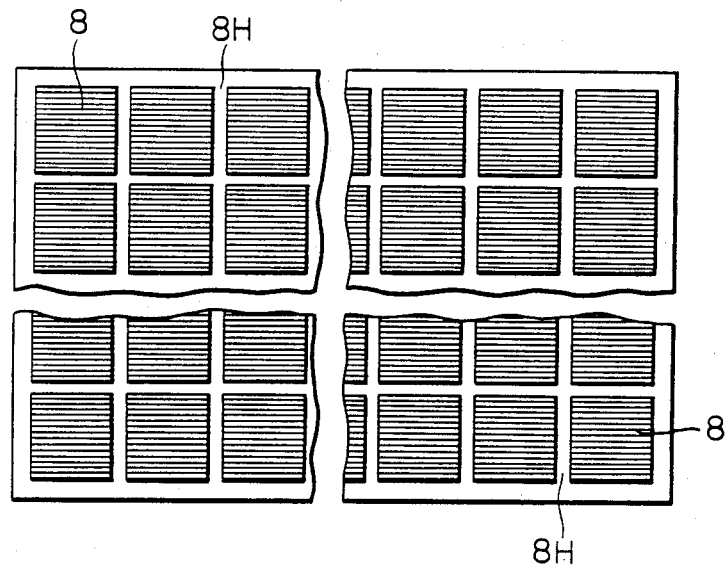

Reflectors 8 made of Al or other metal deposit film are laid under the insulating layer 7. The reflectors 8 have each a mirror surface and a thickness of the order 500 Å to 1 μm and each is disposed so as to face one penetrating hole 6 as shown in FIG. 3, which shows a cross-section taken along line B-B' in FIG. 1. Each reflector 8 is larger in area than each penetrating hole 6 for the purpose of preventing the leakage of light through the interstices 8H between the reflectors.

The portion denoted by 9 is a photoconductive layer made of a well-known photoconductive material which exhibits a dark resistance, as mentioned later, higher than the resistance of the liquid crystal layer 3. Photoconductive materials suitable for this purpose include, for example, Se group chalcogen compounds such as Se, Se-Te, and $As_2Se_3$; II–VI Group compounds such as CdS, ZnO, ZnS and the like; other inorganic materials such as amorphous silicon and the like; and organic photoconductive materials typified by polyvinylcarbazole.

A brief description is given below of the operation of the liquid crystal light valve of FIG. 1, which is of a writing light input type.

When signal beams are projected through the transparent substrate 1b into the photoconductive layer 9 while applying a predetermined voltage between the transparent electrodes 2a and 2b by means of a power source (not shown), the resistance of the irradiated sites of the photoconductive layer 9 will decrease, thereby increasing the voltage across the liquid crystal layer at the positions of transparent holes 6 facing the irradiated sites of the photoconductive layer, and thus turning the direction of alignment of liquid crystal molecules at these positions.

In this fashion, a projection image due to difference in the molecular alignment direction is formed in the liquid crystal layer 3. The liquid crystal light valve in this state is irradiated with projection light from the transparent substrate 1a side, and the projection light is reflected from the reflectors 8, whereby the image formed in the liquid crystal layer 3 is projected with magnification on a screen (not shown).

In this operation process, shading layer 5 and reflectors 8 prevent undesirable phenomena, that is, the leakage of signal beams to the liquid crystal layer 3 side and the incidence of projection light into the photoconductive layer 9.

The projection image formed in the liquid crystal layer 3 of this embodiment can be observed under usual room light without using special projection light unless the projection image is extremely fine.

In this embodiment, it is desirable for the purpose of enhancing the contrast of the projection image that the transparent insulating layer 7 side surface of the shading layer 5 be coated with a light-absorbing material, for example, carbon to absorb therein the projection light reflected from the reflectors 8 to the shading layer 5.

All the reflectors 8 should be conductive and separate from one another though their shape is optional. If the reflectors 8 are in contact with one another, no difference in voltage will develop in the liquid crystal layer 3 and, in consequence, image formation will be impossible.

Moreover, the dark resistance of the photoconductive layer 9 needs to be higher by at least one order than the resistance of the liquid crystal layer 3 for producing any projection image. The dark resistivity of the photoconductive layer 9 is to be of the order at least $10^9$ ohm.cm, preferably $10^{11}$ ohm.cm or more though the condition varies dependent upon the thickness of photoconductive layer 9 itself and the thickness and resistivity of the liquid crystal layer 3.

Modes of deforming the liquid crystal configuration involve those due to a field effect, such as the TN mode (twisted nematic effect), DAP mode (field controlled birefrigence effect), phase transition mode, and GH mode (guest-host effect), besides those due to a current effect such as DSM, so that a suitable type of liquid crystal material is chosen according to each of these modes to be applied.

Another embodiment of this invention is described below referring to FIGS. 4 and 5.

Figure 4:
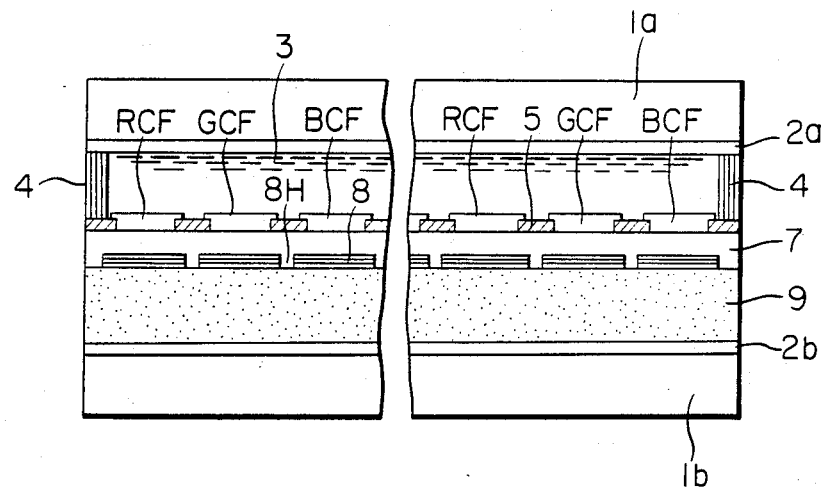
Figure 5:
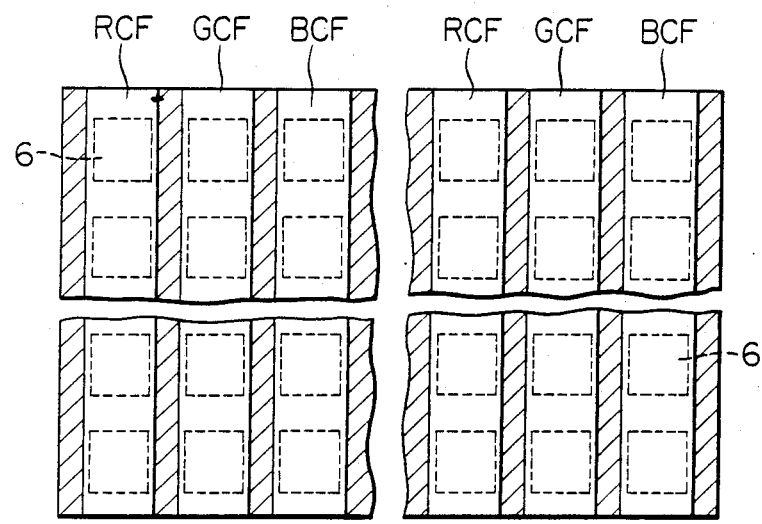

A liquid crystal light valve for color displays of which a schematic cross-sectional view is shown in FIG. 4 is prepared by arranging three kinds of color filters (CF), R (red), B (blue), and G (green), on the penetrating holes of a liquid crystal light valve having the same structure as shown in FIG. 1, to form a striped pattern as shown in FIG. 5, in the following way.

Among the symbols in FIG. 4, the same ones as in FIG. 1 denote the same structural elements as explained above.

Procedure of forming color filter stripes (width of each stripe: 90 μm) is as follows:

A basic dye Floxine G (mfd. by BASF A.G.), which is a red colorant well soluble in water and in organic solvents, was vacuum-deposited (at $5 \times 10^{-6}$ Torr) to form a film 8000 Å thick, on which poly(p-xylylene) (mfd. by Union Carbide Corp.) film 2000 Å thick was then formed by using a reactor for exclusive use (0.1 Torr, 25° C.). A photoresist (trade name: TPR101; mfd. by Tokyo Okakogyo Co.) 5500 Å thick was formed thereupon by using a rotary coater (at 1000 rpm). The photoresist was subjected to the usual exposure-development processing to form a striped pattern. The pattern was etched in an oxygen plasma etching reactor (trade name: Plasmod; mfd. by Tegal Co.) at $2 \times 10^{-2}$ Torr. As a result of the etching for about 60 minutes, needless parts of the colored layer can be removed. Owing to the protective poly(p-xylylene) coating, the colorant film received no damage due to the solvent of the photoresist solution and the development processing.

Then, a blue colorant copper phthalocyanine was vacuum-deposited to form a film of 5000 Å in thickness, which could be directly coated with the same photoresist since phthalocyanine is highly resistant to photoresist solutions. After the red colorant striped pattern was exactly masked, this photoresist was subjected to exposure-development processing to form an etching-resistant photoresist layer, and its needless parts were removed by the oxygen plasma etching process at an oxygen pressure of $2 \times 10^{-2}$ Torr for an etching period of about 10 minutes. Green stripes were prepared by forming a green lead phthalocyanine film of 8000 Å thick by vapor-deposition, polymerizing p-xylylene in a way similar to in the case of red color above to form the polymer film, producing a photoresist pattern, and etching with oxygen plasma ($2 \times 10^{-2}$ Torr)

The thus prepared liquid crystal light valve shown in FIG. 4, with removal of the liquid crystal layer 3, was illuminated with a halogen lamp from the color filter side to project the resulting light beams onto a screen (not shown in the figure) by a magnification factor of 20, giving a clear colored image of stripes, red, green, and blue.

In the embodiment of FIGS. 4 and 5, the pattern of color filters can be altered from the striped form shown in FIG. 5 to a mosaic form, as well. The preparation process of these filters is also not limited to the above-mentioned method.

Figure 8:
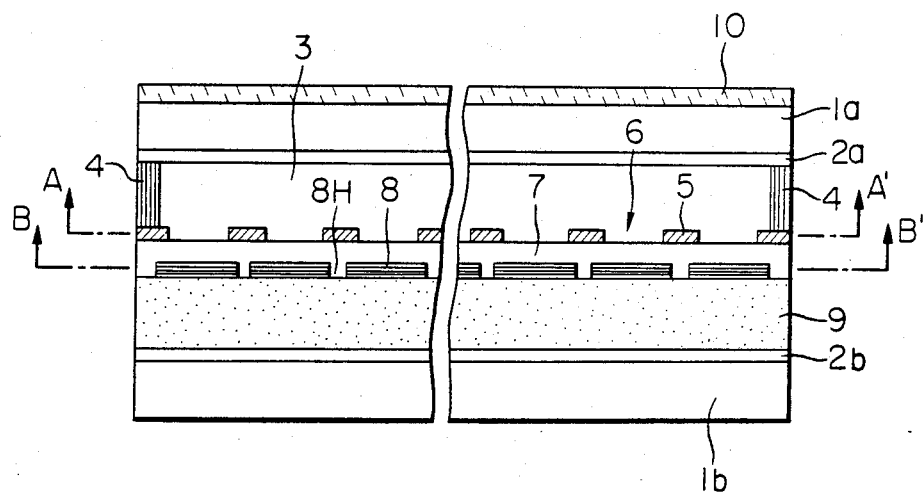
FIG. 8 is a schematic cross-sectional view of another embodiment of the present device.

FIG. 8 is a schematic cross-sectional view of another embodiment of liquid crystal light valve, wherein 10 is a polarizer plate; 1a and 1b transparent substrates of glass or resin; 2a and 2b transparent electrodes of thin film (500–3000 Å thick) made of, for example, $SnO_2$ or $In_2(Sn)O_3$; 3 a liquid crystal layer; and 4 a spacer serving to seal the liquid crystal layer 3 as well as to adjust the layer thickness. Usually, a binder resin mixed with alumina powder or pulverized glass fiber is used for the spacer 4. In general, modes for deforming the configuration of liquid crystals in the layer 3 include those, such as DSM, based on a current effect and those based on a field effect, such as the TN mode, the DAP mode, the phase transition mode, and the GH mode, among which the GH mode is preferable for this embodiment. For the GH type of liquid crystal layer 3, any GH type may be used, but liquid crystal materials of clearing point 50° C. or more, preferably 60° C. or more, are preferably chosen in consideration of the temperature rise during operation. The orientation of the liquid crystals, though homogeneous, may be twisted or in any other state available for the GH mode, of course. Dyes to be incorporated as a guest in the liquid crystal material are desirably highly light resistant ones, for example, anthraquinone dyes. Though the dye content in the liquid crystal material is dependent on the type of liquid crystal, it is generally 0.05 to 10%, preferably 0.1 to 5%, by weight. The thickness of the liquid crystal layer 3 is generally in the range of 1 to 20 μm, from which an appropriate thickness is chosen according to performance characteristics of the liquid crystal material, the response speed, and the operational voltage.

A shading layer 5, approximately 500 Å to 2 μm thick, formed from carbon or a metal by the deposition method has a plane form as in FIG. 2, which shows the cross-section taken on line A-A' in FIG. 8. A number of penetrating holes 6 are disposed in the shading layer 5. One of these penetrating holes 6 corresponds to one picture element of a projection image. The shape of the holes 6 is optional, being not limited to the rectangular form. A light-transmittable insulating layer 7, preferably having a volume resistivity of at least $10^{12}$ ohm.cm, is made of a ferroelectric film, for example, SiC or $Si_3N_4$ film formed by the glow discharge-decomposition method or $SiO_2$, $PbTiO_3$, PLZT, or poly(p-xylylene) film formed by the sputtering vacuum deposition process. The thickness of the transparent insulating layer 7 is desirably in the range of 1000 Å to 5 μm.

A number of reflectors 8 made of Al or other metal deposit film of 500 Å–1 μm thick which have each a mirror surface are disposed so that each faces on penetrating hole as in FIG. 3, which shows a cross-section taken on line B-B' in FIG. 8. Each reflector 8 is larger in area than each penetrating hole 6 for the purpose of preventing the leakage of light through the interstices 8H between the reflectors to the liquid crystal layer side.

A photoconductive layer 9 exhibits a rectifying property in a broader sense, as will be mentioned later, than the rectifying property of usual diodes.

In this embodiment of FIG. 8 also, it is desirable for the purpose of enhancing the contrast of the projection image that the transparent insulating layer 7 side surface of the shading layer 5 is coated with a light-absorbing material such as carbon to absorb therein the projection light reflected from the reflectors 8 to the shading layer 5. The shading layer 5 itself may be made of carbon.

All the reflectors 8 should also be conductive and separate from one another, though their shape is optional, by the reason explained referring to FIG. 1.

Figure 9:
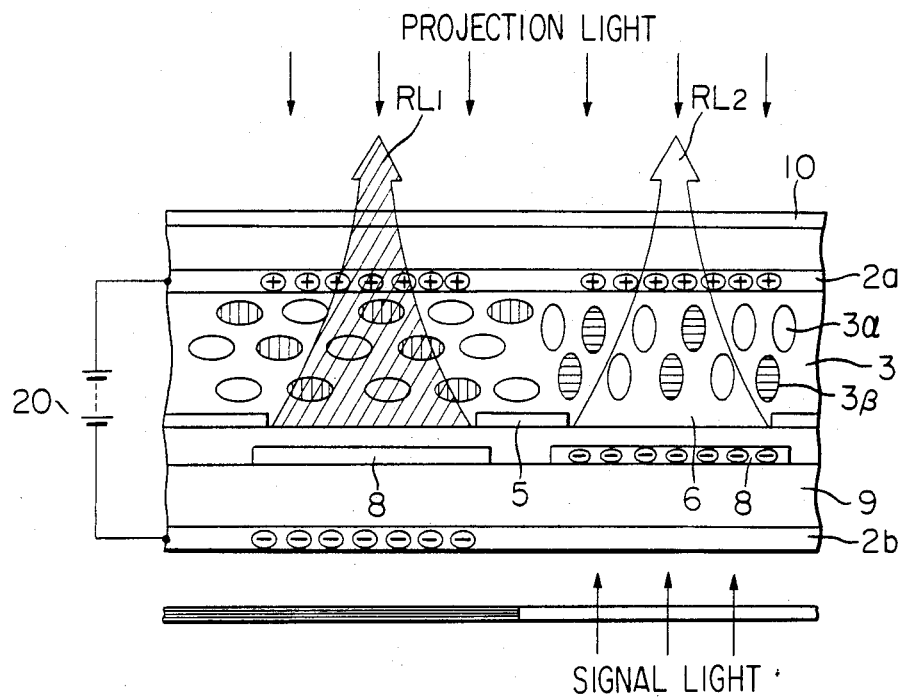
FIG. 9 is a schematic cross-sectional view of an embodiment of the present device for illustrating its principle of operation.

Referring now to FIG. 9, the operation of the writing light input type of liquid crystal light valve shown in FIG. 8 is illustrated in detail and the concept of "rectifying property" in this invention is clarified. FIG. 9 is a schematic diagram for explaining the principle of operation of the light valve device of FIG. 8.

In the light valve shown in FIG. 9, a given d.c. field is applied between transparent electrodes 2a and 2b by means of a power source 20. Under this condition, in the areas irradiated with signal light beams, produced carriers (electrons denoted by ⊖ marks in FIG. 9) are driven to reflectors 8 by the electric field; thereby the potential difference between the transparent electrode 2a and reflectors 8 through penetrating holes 6 increases beyond its threshold value for the liquid crystal material, and in the liquid crystal layer 3 the alignment of liquid crystal molecules 3α and of dye molecules 3β, of positive dielectric anisotropy turns from a homogeneous state to a hometropic state. When projection light is cast through a polarizing plate 10 to this homeotropic state liquid crystal composition, the incident polarized light is passed through penetrating holes 6, and reflected from reflectors 8, thus giving reflected beams $RL_2$.

On the other hand, in the areas not irradiated with the signal beams, no photo-carrier is produced and hence carriers stay in the transparent electrode 2b, not moving to reflectors 8. Accordingly, the potential difference across the liquid crystal layer 3 does not exceed the threshold value and liquid crystal molecules 3α and dye molecules 3β remain in the homogenous alignment state. The polarized incident projection light is absorbed in the dichroic dye 3β in the liquid crystal layer 3; thus the intensity of the reflected beams $RL_1$ cast back from reflectors 8 is lower than that of the reflected beams $RL_2$.

In this fashion, a projection image due to the difference in the reflected beam intensity is formed in the liquid crystal layer 3 and projected to a screen (not shown) with magnification.

Also in this light valve device, the leakage of signal beams to the liquid crystal layer 3 side and the incidence of projection light into the photoconductive layer 9 are prevented by the shading layer 5 and the reflectors 8.

The projection image produced in the liquid crystal layer 3 can be observed, also in this case, under usual room light without using special projection light unless the image is extremely fine.

Figure 10:
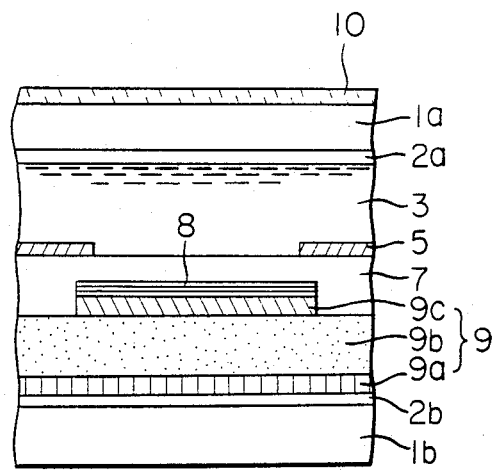
FIG. 10 is a schematic partly sectional view of an embodiment of the present device.

Now, the construction of the liquid crystal light valve of this invention is illustrated in detail referring to preferred embodiments shown in FIG. 10.

In an example of the construction, as shown in FIG. 10 a base layer 9a is formed by vacuum deposition of Pt, Pd, Au, or Mo to a thickness of 20 to 500 Å, preferably 30 to 200 Å, on a transparent electrode 2b which is laid on a transparent substrate 1b. The base layer 9a is overlaid with a a-Si-H (hydrogen-containing amorphous silicon) layer 9b by electric discharge decomposition of a gas composed mainly of $SiH_4$. This a-Si-H layer has a weak nature of n type of semiconductor and forms a Schottky barrier in contact with the base layer 9a. This a-Si-H layer 9b is usally called "i-layer", and its thickness is generally in the range of 5000 Å to 20 μm though it is decided in connection with other layers, particularly with the liquid crystal layer 3.

On this a-Si-H layer 9b, a n-type layer 9c of 100 to 3000 Å, preferably 500 to 2000 Å, in thickness is formed by electric discharge decomposition of a gas composed mainly of $SiH_4$ and containing 100 to 20,000 ppm, preferably 1000 to 10,000 ppm, of $PH_3$, thus forming a rectifying photoconductive layer 9.

Figure 11A:
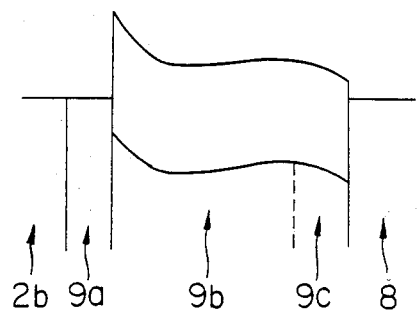
FIGS. 11A, 11B, and 11C are schematic illustrations showing the band diagram of the photoconductive layer in embodiments of the present device.

Similarly to the embodiment shown in FIG. 8, Al reflectors 8, a light-transmittable insulating layer 7, and a shading layer 5 are formed. A GH type of liquid crystal layer 3 is sealed between the shading layer 5 and a transparent electrode 2a formed on one surface of a transparent substrate 1a of which the other surface has been conered with a polarizing plate 10. Thus, an example of the liquid crystal light valve device of this invention is completed. The band diagram of the photoconductive layer 9 of this light valve device is shown in FIG. 11A.

As can be seen from this band diagram, application of voltage between the transparent electrodes 2a and 2b for producing a projection image with this device is conducted so that the 2b side may become negative. In this case, if the a-Si-H layer (i-layer) 9b is in contact with the transparent electrode 2b without interposing the Schottky barrier, carriers (electrons, the i-layer being of a weak n-type) will be injected from the transparent electrode 2b into the a-Si-H layer 9b, and hence no expected projection image cannot be obtained when the dark resistance of the photoconductive layer 9 is in the order of $10^8$ to $10^9$ ohm.cm. On the contrary, when a Schottky barrier is present like in this embodiment, the carrier injection into the photoconductive layer 9 is prevented thereby and the dark resistance of the photoconductive layer 9 reaches at least $10^{12}$ ohm.cm, so that expected projection images can be formed.

The n-layer 9c in this embodiment makes possible an easy and stable sweeping of photo-carriers from the reflectors 8 to the transparent electrode 2b when a projection image is erased. This n-layer 9c, having low electric resistance, needs to be divided into a plurality of separate portions to isolate electrically one another for the purpose of forming images. In practice, nearly the same pattern of n-layers as the reflectors 8 shown in FIG. 10, are formed by a photo-etching process.

When the projection light is cast and reflected from the reflectors 8, as parallel rays, the area of the separate n-layer 9c is required to be equal to or slightly larger than that of the separate reflector 8. If the former area is less than the latter area, the reflector surface becomes uneven and therefore, scatters incident light, that is, it acts as a diffusion plate.

Further, if the reflector 8 is in contact with the a-Si-H layer 9b surface without interposing the n-layer 9c, a barrier is occasionally formed between the two layers and may cause a trouble such as local or insufficient sweeping of photo-carriers. The n-layer 9c, however, can be omitted if such a barrier is not formed.

The voltage to be applied to the device of this embodiment during sweeping of photo-carriers may be either a.c. or d.c. to make the transparent electrode 2b positive relative to the electrode 2a unless the voltage applied to liquid crystal layer 3 exceeds the threshold value.

Figure 11B:
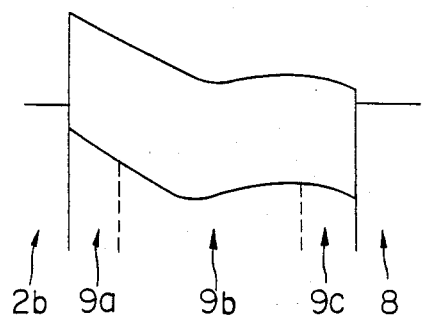

The second example of the construction of the present device is described below. On a transparent electrode 2b, a P-layer 9a of 30 to 1000 Å thick, preferably 50 to 300 Å thick, is deposited by glow discharge decomposition of a gas comprising $SiH_4$ as a main component and 50 to 20,000 ppm, preferably 200 to 10,000 ppm, of $B_2H_6$. Proper thickness of this P-layer 9a is decided in connection with the quantity of signal beams to be absorbed and the formation of a depletion layer between the P-layer 9a and a a-Si-H layer (i-layer) 9b to be formed thereon. Then, similarly to the first example of the construction, a a-Si-H layer 9b, n-layer 9c, reflectors 8, light transmittable insulating layer 7, and a shading layer 5 are laminated successively and a liquid crystal layer 3 is sealed between another transparent electrode 2a and the shading layer 5 or the insulating layer 7, thus completing a liquid crystal light valve device. The band diagram of the photoconductive layer 9 of this device is shown in FIG. 11B. As can be seen from this diagram, the polarity of the operational voltage in the projection image formation is the same as the above first example and similar effects are obtained.

Also in this example, the sweeping of photo-carriers from the reflectors 8 to the transparent electrode 2b can be performed similarly to the above first example. The p-layer 9a may also be a heterojunction produced by forming the a-Si-H layer 9b on a deposit film (p-type a-Si-C-H) produced by glow discharge decomposition of a mixture of $SiH_4$ and $CH_4$; such a heterojunction has much the same effects as in the first example.

In the third example of the construction, the liquid crystal light valve is constructed in the same manner as in the case of the above second example except for the photoconductive layer 9. The photoconductive layer 9 of this example is prepared as follows: On a transparent electrode 2b, a light-transmittable insulating layer 9a of a-Si-N-H film, $SiO_2$ film, or poly(p-xylylene) film is formed in the thickness of 50 to 10,000 Å, preferably 100 to 3000Å, and thereafter a a-Si-H layer 9b and a n-layer 9c are laminated successively in the same manner as in the case of the above two examples.

Figure 11C:
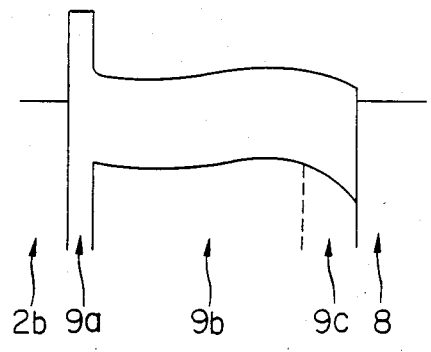

A band diagram of the photoconductive layer 9 of this example is shown in FIG. 11C.

In this example, the polarity of operational voltage in the projection image formation is the same as in the case of the above two examples and similar results are obtained since the carrier injection from the transparent electrode 2b into the a-Si-H layer (i-layer) 9b is prevented by the insulating layer 9a and the a-Si-H layer 9b is made of a n-type of semiconductor and the polarity of voltage applied upon forming projection images is the same as that in the above two examples. The sweeping of photo-carriers can also be performed similarly to the above examples.

In the above three examples, while the photoconductive layer including the p-layer, a-Si-H layer (i-layer), and n-layer is prepared by the electric discharge decomposition of a gas composed mainly of $SiH_4$, it is also possible by the electric discharge decomposition of a gas composed mainly of $SiF_4$ to prepare the P-layer ($B_2H_6$ or the like is used as a doping gas), a-Si-F-H layer (i-layer), and n-layer ($PH_3$ or the like is used as a doping gas) in the same way as in the case of the former gas.

As regards amorphous silicon materials (a-Si-H, a-Si-F-H), their preparation processes and properties and doping effects thereupon are described in detail in "Handbook of Amorphous Electronic Material Utilization Techniques" (published by Science Forum Co., 1981) and other documents.

It may be also noted, though it is readily predictable, that other materials applicable as the rectifying photoconductive layer of this invention include a lamination of light-transmittable insulating film with SeTe, $As_2Se_3$, CdS, or CdTe and a heterojunction of CdS (n-type) with CdTe (p-type).

Figure 13:
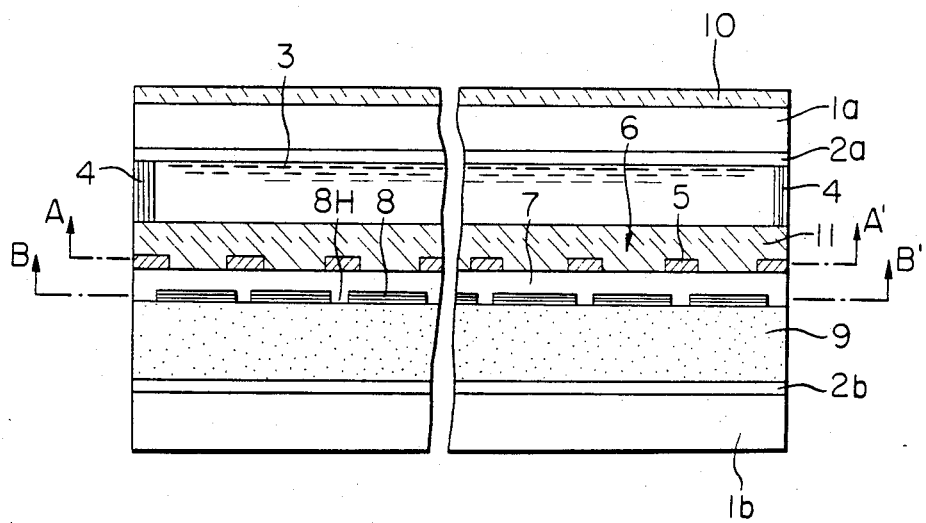
FIG. 13 is a schematic cross-sectional view of another embodiment of the present device.

FIG. 13 shows a device substantially the same as shown in FIG. 8 except for being equipped with an analyser 11. The symbols common to the two figures represent the same respective components. In this device, a TN mode is adopted as a suitable one for deforming the liquid crystal configuration. Though there is no specific restriction on the liquid crystal material used for this TN type liquid crystal layer 3, it is desirable to choose those having a clearing point of at least 50° C., preferably 60° C. or more, in view of the temperature rise during operation, particularly due to the projection light, in operation. The twist angle of liquid crystal alignment, though not particularly restricted, is usually 90°. The thickness of the liquid crystal layer 3 is generally in the range of 2 to 20 $\mu$m, from which an appropriate thickness is chosen according to performance characteristics of the liquid crystal material, the response speed, the correlation with the photoconductive layer, or the like.

The analyser 11 incorporated in this device is prepared by stretching a poly(vinyl alcohol) on which iodine or a dichroic dye has been adsorbed. This analyser 11 is bonded onto the light-transmittable insulating layer 7 surface and onto the shading layer 5 surface, which will be described later in detail, through an adhesive layer of 5000 Å to 2 $\mu$m thick spiner-coated. The thickness of the analyser 11 is generally in the range of 2 to 20 $\mu$m, preferably 5 to 15 $\mu$m.

Figure 14:
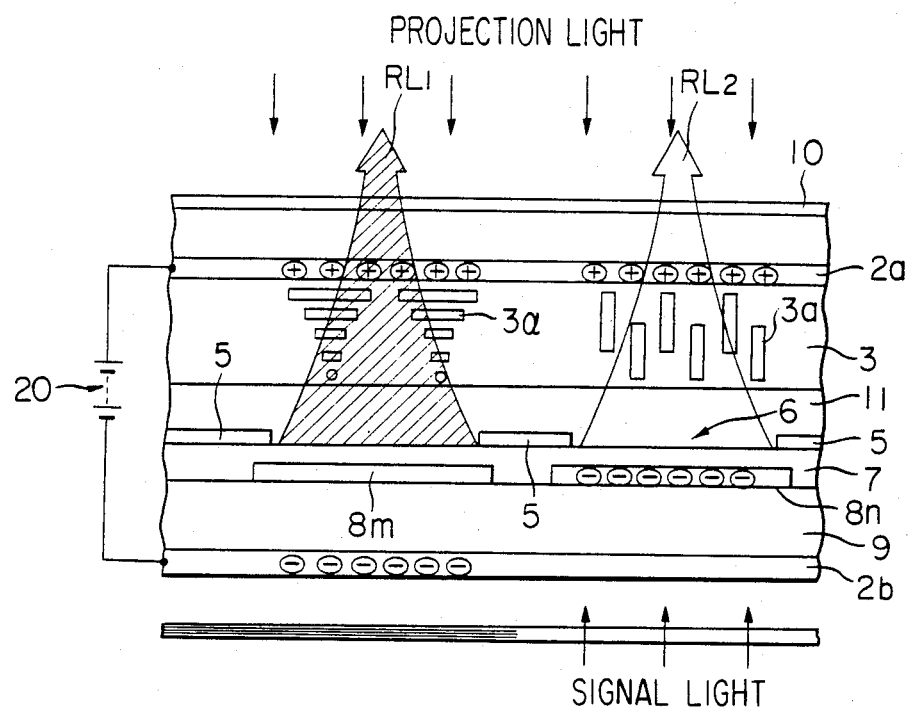
FIG. 14 is a schematic cross-sectional view of another embodiment of the present device for illustrating its principle of operation.

Referring now to FIG. 14, the operation of the writing light input type of liquid crystal light valve shown in FIG. 13 is illustrated in detail and the concept of "rectifying property" in this invention is clarified. FIG. 14 is a schematic diagram for explaining the principle of operating the light valve device of FIG. 13.

Referring to FIG. 14, a given d.c. field is applied between transparent electrodes 2a and 2b by means of a power source 20. Under this condition, in the areas irradiated with signal light beams, produced photo-carriers (electrons denoted by ⊖ marks in FIG. 14) are driven to reflectors 8n by the electric field; thereby the potential difference between the transparent electrode 2a and reflectors 8n through penetrating holes 6 increases beyond its threshold value for the liquid crystal material, and in the liquid crystal layer the alignment of liquid crystal molecules 3a turns from a twisted state (in the FIG. 14, twist angle: 90°) to a homeotropic state. When projection light is cast through a polarizing plate 10, the liquid crystal layer 3, and an analyser 11, the incident polarized light is passed through transparent holes 6 and reflected from reflectors 8, thus giving reflection beams $RL_2$.

On the other hand, in the areas not irradiated with the signal beams, no photo-carrier is produced and hence negative charges stay in the transparent electrode $2b$, not moving to reflectors $8m$. Accordingly, the potential difference across the liquid crystal layer 3 does not exceed the threshold value and liquid crystal molecules $3\alpha$ are kept in the twisted alignment state. The polarized projection light incident here is absorbed in the analyser 11 and thus the intensity of the reflected beams $RL_1$ cast back from reflectors 8 is lower than that of the reflected beams $RL_2$.

In this fashion, a projection image (for the purpose of projecting) due to the difference in the reflected beam intensity is formed in the liquid crystal layer 3 and projected to a screen (not shown in the figure) with magnification.

The projection image obtained here is positive, but it becomes negative when the polarization directions of the polarizer 10 and the analyser 11 are set to cross at right angles. Photo-carriers accepted in reflectors $8_n$, after removal of the applied voltage, remain there owing to a high electric resistance of the transparent insulating layer 7, that is, the formed projection image has some definite durability.

Also in this embodiment, the leakage of signal beams to the liquid crystal layer 3 and the incidence of projection light into the photoconductive layer 9 are prevented by the shading layer 5 and the reflectors 8.

The projection image also in this embodiment can be observed under usual room light without using special projection light unless the image is extremely fine.

Figure 15:
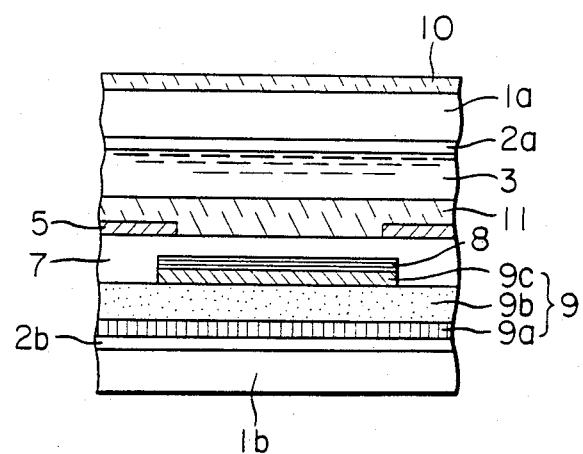
FIG. 15 is a schematic partly sectional view of another embodiment of the present device.

A specific example of the structure of the device equipped with an analyser like in FIG. 13 is shown in FIG. 15.

This device is substantially the same as that shown in FIG. 10 except that the analyser 11 is incorporated therein and a TN type liquid crystal layer 3 is sealed between the analyser 11 and a transparent electrode $2a$, and the symbols common to both FIGS. 15 and 10 represent the same components.

The same relations exist also in this FIG. 15 as of the construction examples, the first, second, and third, in FIG. 10 to the band diagrams shown in FIGS. 11A, 11B and 11C.

Figure 16:
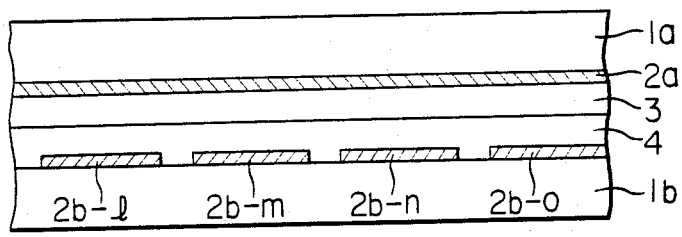
FIGS. 16 to 18 are schematic cross-sectional views of other embodiments of the present device.
Figure 17:
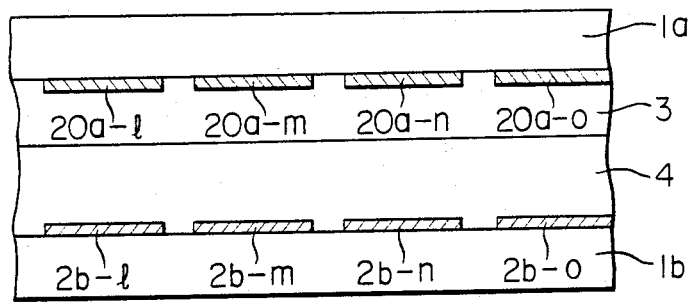

FIGS. 16 and 17 are schematic cross-sectional views for illustrating still further embodiments of this invention.

The symbols common to FIGS. 16 and 17 represent the same components.

In these figures, $1a$ is a projection side transparent substrate and $1b$ is a writing light input side transparent substrate, both consisting of a material selected from various glass or plastic plates. In FIG. 16, $2a$ is a transparent electrode consisting of, for example, a thin film of $SnO_2$ or $In_2(Sn)O_3$. In both figures, $2b-l$, $2b-m$, $2b-n$, and $2b-o$ are writing light input side transparent electrodes arranged in a striped pattern and consisting of a material similar to the transparent electrode $2a$. In FIG. 17, $20a-l$, $20a-m$, $20a-n$, and $20a-o$ are projection side transparent electrodes arranged in a striped pattern similarly to the above group of electrodes. In these figures, the longitudinal direction of every striped electrode is perpendicular to the drawing surface.

In these figures, 3 is a liquid crystal layer and 4 a photoconductive layer. The photoconductive layer 4 generally consists of a well-known photoconductive material exhibiting a higher dark resistance than the resistance of the liquid crystal layer 3, as mentioned later. Such photoconductive materials, usable for the photoconductive layer 4, as stated referring to FIG. 1, include Se group chalcogen compounds such as Se, Se-Te, and $As_2Se_3$; II–VI group compounds such as CdS, ZnO, ZnS and the like; other inorganic materials such as amorphous silicon; and organic photoconductive materials typified by polyvinylcarbazole.

When a projection image is formed, the dark resistance of the photoconductive layer 4 also needs to be higher at least one order than the resistance of the liquid crystal layer 3. The dark resistivity of the photoconductive layer 4 is to be of the order of at least $10^9$ ohm.cm, preferably $10^{11}$ ohm.cm or more, though it is dependent upon the thickness of the photoconductive layer 4 itself and the thickness and resistivity of the liquid crystal layer 3.

Modes of deforming the liquid crystal configuration also involve those due to a field effect, such as the TN mode, DAP mode, phase transition mode, and GH mode, besides those due to a current effect such as DSM, so that a suitable type of liquid crystal material is chosen according to each of these mode to be applied.

Meanwhile, in order to form a projection image corresponding with desired lines or rows or to erase or correct a projection image having a memory action, there is a reasonable criterion for deciding which construction of FIGS. 16 and 17 is to be adopted; viz. the spread of electric field between the electrodes and the resolution degree desired should be taken into consideration. Generally speaking, however, it is desirable to adopt the construction of FIG. 16 (such that one of the electrodes is divided into stripes) for a light valve device wherein the distance between the counter electrodes is smaller than the width of one stripe of electrode while it is desirable to adopt the construction of FIG. 17 (such that both the electrodes are divided into stripes) for the device wherein said distance is larger on the contrary.

Such an embodiment of the device is operated by applying a voltage (applied voltages for image formation and erasure are opposite in polarity to each other) between striped electrodes suitably selected and a counter electrode.

Figure 18:
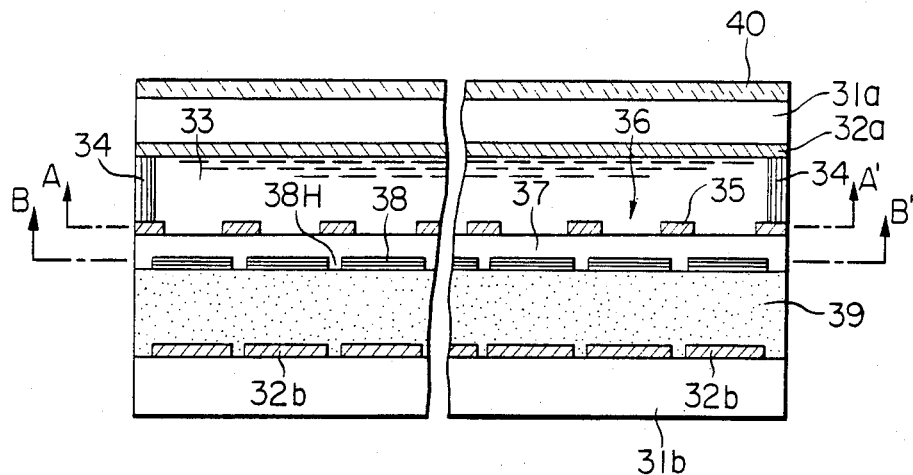

Further, a liquid crystal light valve device for obtaining TV-compatible dynamic images by employing a rectifying photoconductive layer is described below with reference to another embodiment, of which a schematic cross-sectional view is shown in FIG. 18.

Figure 19:
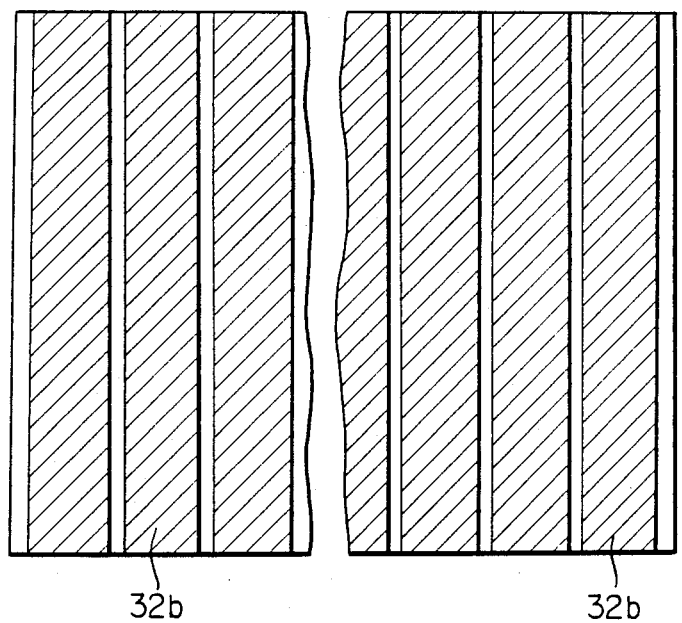
FIG. 19 is a schematic diagram illustrating a striped pattern of electrodes in an embodiment of the present device.

The device was prepared by the following procedure: a transparent substrate $31b$ was formed from Corning 7059 slide glass. On one side surface thereof, a transparent electrode of $In_2(Sn)O_3$ (mfd. by Matsuzaki Shinku Co.) was formed and subjected to a photoetching process to give a group of writing light input side electrodes $32b$ having a striped pattern as shown in FIG. 19. Each width and the pitch of the electrodes were 90 μm and 100 μm, respectively.

A rectifying photoconductive layer 39 was formed further thereupon.

In a reaction furnace provided with an anode and a cathode of each 200 mmφ, distant 50 mm from each other, was set the slide glass substrate associated with the electrodes on the anode side. A SiH$_4$/H$_2$ (1:9) gas mixture (4 SCCM) and a B$_2$H$_4$/H$_2$=100 PPM gas mixture (10 SCCM) were introduced into the furnace at Ts (the substrate temperature) of 250° C. and P$_B$ (base pressure) of 1×10$^{-6}$ Torr to set the gas pressure at 0.1 Torr. The introduced gas was decomposed by generating a glow discharge at RF of 13.56 MHz and RF power of 10 W to deposit a p-type of a-Si-H layer (p-layer) of 100 Å thick. Succeedingly, a SiH$_4$/H$_2$ (50:50) gas mixture (20 SCCM) was introduced (P$_B$=1×10$^{-6}$ Torr) to set the gas pressure at 0.15 Torr and was decomposed by glow discharge (T$_S$=250° C., RF power=15 W) to deposit a a-Si-H layer of 10 μm thick. Then, similarly a SiH$_4$/H$_2$ (1:9) gas mixture (2 SCCM) and a PH$_3$/H$_2$=100 PPM gas mixture (10 SCCM) were introduced (P$_B$=1×10$^{-6}$ Torr) to set the gas pressure at 0.1 Torr and was decomposed by glow discharge (T$_S$=200° C., RF power=8 W) to deposit a n-type of a-Si-H layer (n-layer) of 1000 Å thick. This n-layer was etched to the same pattern as the reflector shown later. The photoconductive layer 39 thus prepared exhibits a rectifying property as the band diagram of FIG. 20 indicates.

Al was deposited on the rectifying photoconductive layer 39 by electron beam vacuum deposition in the thickness of 1500Å and was photo-etched to form reflectors 38 having a pattern as shown in FIG. 3 (the cross-section taken along line B-B' in FIG. 18) of each area 90 μm×90 μm and pitch 100 μm, so that the reflectors and the striped transparent electrodes 32b might be superposed one by one (in this case for "8 and 8H" read "38 and 38H", respectively, in FIG. 3). Each reflector 38 is designed to be wider than each penetrating hole 36 for the purpose of preventing the light leakage through the intersticial area 38H around each reflector.

Further, a light-transmittable insulating layer 37 consisting of a-Si-N-H was deposited on the reflectors 38 in the thickness of 5000Å as follows: Using the same reaction furnace as used for the formation of the a-Si-H layer, the plate resulting from the above preparation steps was set on the anode side in the furnace, a SiH$_4$/H$_2$ (1:9) gas mixture (5 SCCM) and pure NH$_3$ gas (20 SCCM) were introduced P$_B$=1×10$^{-6}$ Torr) to set the gas pressure at 0.15 Torr, and glow discharge was generated (T$_S$=250° C., RF power=5 W) to deposit the a-Si-N-H layer. On this layer, a 1500-Å thick Al layer was deposited and photo-etched to form a shading layer 35 having a pattern as shown in FIG. 2 (the cross-section taken on line A-A' in FIG. 18; in FIG. 2, for "5 and 6" read "35 and 36" in this case). The shading layer 35 was designed to overlap each reflector 38 in a width of 5 μm. Each penetrating hole 36 shown in FIGS. 18 and 2 has an area of 80 μm×80 μm.

Then, poly(p-xylylene) was deposited on the shading layer 35 by a gaseous phase thermal decomposition process in the thickness of 3000 Å. On the perimeter of the shading layer 35, a spacer 34 having an injection port necessary in a later preparation step was formed by coating an epoxy resin in which Al$_2$O$_3$ powder having a particle size of 5 μm had been dispersed. On the spacer 34, a Corning 7059 slide glass 31a was bonded by pressing, of which the inside surface had been coated with a 3000Å thick transparent electrode 32a of poly(p-xylylene) subjected to a liquid crystal orientation controlling treatment. After the epoxy resin was heat-cured sufficiently, the resulting plate and a GH type received a liquid crystal orientation liquid crystal material were placed in a vacuum chamber, which was then evacuated with a rotary pump to a vacuum of 1×10$^{-2}$ Torr. Said injection port was covered with the liquid crystal material to leak it into the space between the shading layer 35 and the transparent electrode 32a. After the space was completely filled, the injection port was sealed with the same epoxy resin. Orientation of the liquid crystal was a homogeneous alignment. A dispersion of 0.5% by weight of anthraquinone blue dye D5 (mfd. by BDH Chemical Co.) in Nematic Phase 1289 (mfd. by Merck and Co.) was used as the liquid crystal material. A polarizing plate 40 consisting of a polarizing film NPF-Q-12 (neutral gray; mfd. by Nitto Denko Co.) was attached onto the transparent substrate 31a. Thus, a writing light input type of liquid crystal light valve device was completed as an embodiment of this invention shown in FIG. 18.

A brief description is given below on the principle of operation of this device.

A d.c. voltage of 2.7 V was applied to a definite stripe of transparent electrode 32b and to the transparent electrode 32a for 10 m sec to make the former side negative. Then, the transparent electrodes 32b was scanned with a laser beam for 60 μ sec. which was prepared by condensing a He-Ne laser beam (5 μ sec; 500 μW/cm$^2$) to 100 μmφ and reflecting by a polygonal mirror, thereby forming a projection image at the position corresponding to the definite electrode 32b in the liquid crystal layer 33.

Figure 21A:
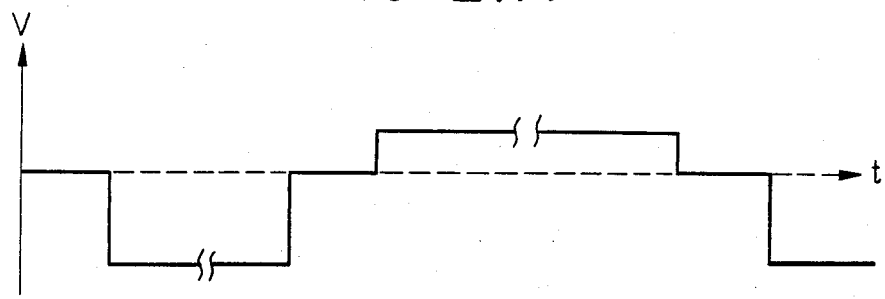
FIGS. 21A and 21B are time charts of applied voltage in the embodiment shown in FIG. 18.

After the applied voltage was removed for 120 μ sec, a d.c. voltage of 1.4 V was applied for 20 m sec between the transparent electrode 32a and the striped transparent electrodes 32b to make the latter positive, thereby erasing the projection image. FIG. 21A shows a time chart of said applied voltage.

Figure 21B:
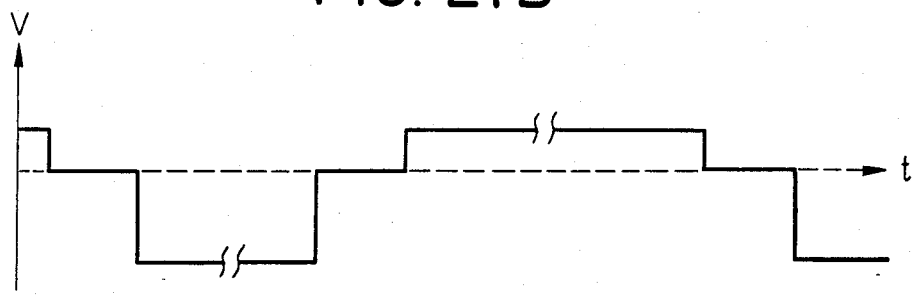

As shown in FIG. 21B, a d.c. voltage was applied between a given stripe of transparent electrode 32b and the transparent electrode 32a so as to form a projection image, and 60 μ sec later the same cycle voltage as shown in FIG. 21A was applied between the next stripe of transparent electrode 32b and the transparent electrode 32a. Repetition of the same operation gave and erased projection images meeting to writing light input signals at the positions corresponding to the respective stripes of transparent electrodes 32b in the liquid crystal layer 33.

As can be readily understood, TV-compatible dynamic images can be formed from frame to frame by projecting writing light input signals synchronized while applying the same cycle voltages through a shift register to the stripes of transparent electrodes 32b in series. It is also possible that an optional line or row is selected to form a projection image. Furthermore, driving of the voltage substantially does not differ from A.C. driving, the life of liquid crystal material is not different from the case of A.C. driving.

In FIGS. 21A and 21B, the ordinate indicates the applied voltage (V) and the abscissa the elasped time (t).

Figure 20:
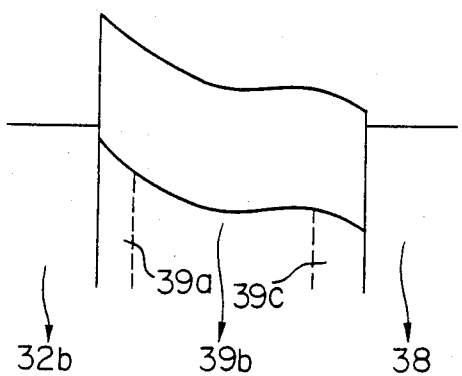
FIG. 20 is a schematic illustration showing the band diagram of the photoconductive layer in an embodiment of FIG. 18 above.

FIG. 20 is a schematic illustration showing the band diagram of the photoconductive layer 39 of the device of which construction is shown in FIG. 18. 39a indicates a p-type a-Si-H layer (p-layer), 39b a a-Si-H layer, and 39c a n-type a-Si-H layer (n-layer).

The present invention will be illustrated in more detail with reference to the following Examples.

EXAMPLE 1

Figure 6:
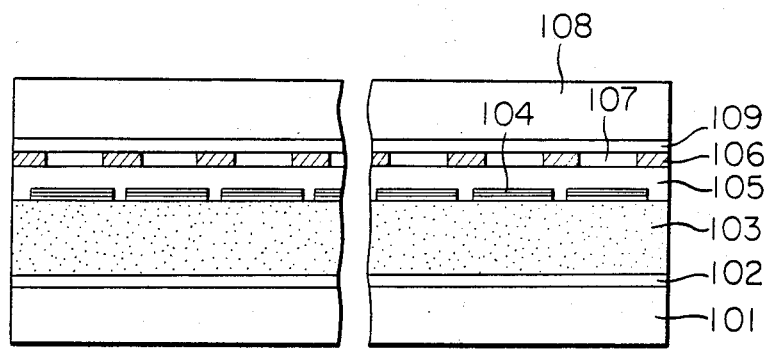

FIG. 6 shows a schematic cross-sectional view of the device of this Example.

A transparent electrode 102 of ITO film (mfd. by Matsuzaki Shinku Co.) was formed on one side surface of a Corning 7059 slide glass 101. On this electrode, a 5-μm thick amorphous silicon film 103 exhibiting an excellent photoconductivity was formed by the 13.56 MHz RF discharge decomposition of a $SiH_4/H_2$ (1:9) gas mixture under conditions of base pressure $1 \times 10^{-6}$ Torr or less, gas flow rate 20 SCCM, gas pressure 0.1 Torr, substrate temperature 200° C., and discharge power 10 W. Then, Al was vacuum-deposited thereupon in the thickness of 2000 Å. The vacuum decomposition at a pressure of $10^{-3}$ Torr or less yields an Al film of mirror face. The Al film was photo-etched into a number of reflectors 104, each 90 μm × 90 μm in size, being distant 10 μm from each other.

On the reflectors 104, a 5000-Å thick $Si_3N_4$ film 105 was formed by the 13.56 MHz RF discharge decomposition of a $SiH_4/H_2$ (1:9) gas mixture (flow rate 5 SCCM) and $NH_3$ gas (flow rate 20 SCCM) under conditions of base pressure $1 \times 10^{-6}$ Torr or less, total gas pressure 0.15 Torr, substrate temperature 200° C., and discharge power 10 W. This $Si_3N_4$ film showed good transmittance for light and high electric insulation resistance. On the $Si_3N_4$ film 105, an Al film 2000 Å thick was deposited and photo-etched to prepare penetrating holes 107 each 80 μm × 80 μm in size at regular intervals as shown in the figure.

On one side surface of another slide glass, a $In_2(Sn)O_3$ film 109 was formed, coated with water-containing glycerol, was laid on the Al film 106 to bring the region above the $Si_3N_4$ film 105 to a conduction state.

Figure 7:
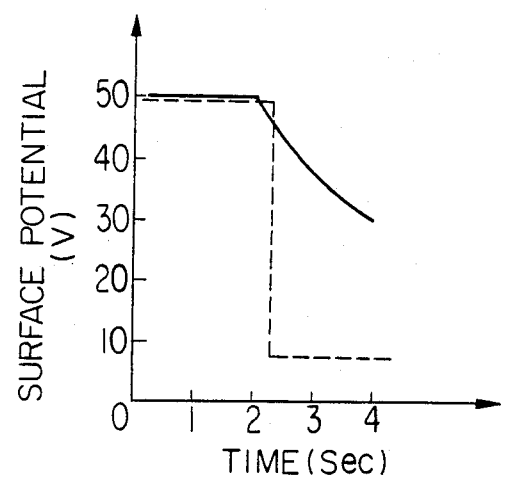
FIG. 7 is a graph showing results of experiments on the embodiment shown in FIG. 6.

A d.c. voltage of 50 V was then applied for 2 seconds between the $In_2(Sn)O_3$ (ITO) films 109 and 102 to make the 109 side negative. Alternations of surface potential were measured with an electrometer when the device was irradiated with projection light (using a halogen lamp) of intensity of 100 mW/cm² at 0.5 second after stop of the voltage application and when not irradiated. The results are shown in FIG. 7.

The solid line in the figure indicates the results common to the cases without any irradiation and with the irradiation from the slide glass 108 side. The dotted line indicates the results in the case of the irradiation from the slide glass 101 side, wherein a rapid decrease in the surface potential is observed immediately after the irradiation (about 1 m sec. later).

It is evident from these experiments that the construction combining the reflectors 104 and the Al film 106 of this invention provides a good performance.

While the reflectors 104 of Al deposition film were 2000 Å in thickness, effective thickness thereof is in the range 700–5000 Å. The Al film is desirably to be thin since peeling rarely occurs, less time is required for its etching, and the more uniform liquid crystal layer laminated is obtainable. However, a thin Al film may transmit light at its particularly thin parts if its thickness is nonuniform and the possibility of occurrence of thermal diffusion of Al into the insulating layer of $Si_3N_4$ 105 exists. Accordingly, the thickness is preferred to be in the range of 1000–3000 Å. The thickness of the $Si_3N_4$ film 105 (insulating layer) is also desirably thin because less voltage drop results from the thin film. However, there is a lower limit in order to prevent the leak of current through it and the limit depends upon the operational voltage and its material. In consideration of the distribution of operational voltage, however, the thickness is preferably of the same as order or less than the amorphous silicon film 103 (photoconductive layer).

While the penetrating holes in this Example had an each area of 80 μm × 80 μm and a pitch of 100 μm, reduction of these values can enhance, as a matter of course, the resolving power.

The device of this invention is designed so that the area of each reflector will be larger than the opening area of each penetrating hole in order to prevent the incidence of the projection light into the photoconductive layer and the incidence of the signal beam into the liquid crystal layer. In this case, the segment of the layer portion of the reflector corresponding to the transmission hole opening is desirably larger than the thickness of the insulating layer laid between them.

It is also possible in this invention to apply the well-known liquid crystal orientation controlling treatment to the surfaces of the transparent electrode and of the shading layer (color filter in some cases) which are in contact with the liquid crystal layer.

EXAMPLE 2

This Example is illustrated referring to FIG. 8 and FIG. 10. $In_2(Sn)O_3$ (mfd. by Matsuzaki Shinku Co.) laid on a Corning 7059 slide glass 1b was employed as a transparent electrode 2b, on which a Pt layer 9a of 40Å thick was formed by vacuum deposition of Pt using an electron beam under conditions of $P_B$ (base pressure) $1 \times 10^{-6}$ Torr, deposition rate (R) 1 Å/S, and substrate temperature 80° C. A a-Si-H layer 9b was then deposited in the thickness of 10 μm on a slide glass by the capacitive coupling type glow discharge decomposition process as follows:

In a reaction furnace provided with an anode and a cathode of both 200 mm in diameter, distant 50 mm from each other, the slide glass was set on the anode side and a $SiH_4/H_2$ (50:50) gas mixture was introduced at the rate of 20 SCCM ($P_B 1 \times 10^{-6}$ Torr) and decomposed by glow discharge under conditions of substrate temperature 250° C., gas pressure 0.05 Torr, RF 13.56 MHz, RF power 15 W, and deposition period 10 hours. The a-Si-H layer thus obtained exhibited a good photoconductivity; $\rho D$ (dark resistivity) $10^{10}$ ohm.cm, $\rho L$ (resistivity, when irradiated with a He-Ne laser beam of 1 mW/Cm²) $10^5$ ohm.cm, as measured by the surface fashion with a comb type electrode.

On the a-Si-H layer 9b, Al was deposited in the thickness of 2000 Å by the electron beam vacuum deposition process, under conditions of $P_B$ (base pressure) $1 \times 10^{-5}$ Torr, substrate temperature 60° C., and deposition rate 10 Å/S. The Al deposit was photo-etched into a number of reflectors 8, each 90 μm × 90 μm in size, having a pitch of 100 μm (a pattern as shown in FIG. 3).

A light-transmittable insulating layer 7 of a-Si-N-H of 3000 Å thick was deposited thereupon as follows. In the same reactor as used for the above a-Si-H layer formation, the resulting plate was set on the anode side and a $SiH_4/H_2$ (1:9) gas mixture (at 5 SCCM) and pure $NH_3$ gas (at 20 SCCM) were decomposed under conditions of base pressure $1 \times 10^{-6}$ Torr, gas pressure 0.15 Torr, substrate temperature 250° C., and RF power 5 W to deposit for 5 hours. The a-Si-N-H layer thus produced had a volume resistivity of $10^{14}$ ohm.cm or more.

Al of 2000 Å thick was deposited thereupon and photoetched to form a shading layer 5 having a pattern as shown in FIG. 2. In this case, the width of the overlapping portion of the shading layer 5 with the reflector 8 was made to be 5 μm. Consequently, the size of the opening of the hole 6 was 80 μm×80 μm.

A poly(p-xylylene) layer of 2000 Å thick was deposited on the shading layer 5 by a gaseous phase thermal decomposition process. The surface of the poly(p-xylylene) was rubbed with a cotton cloth for the liquid crystal orientation controlling purpose.

On the perimeter of the shading layer 5 [the poly(p-xylylene) on this region had been removed], a 5 -μm thick epoxy resin layer in which $Al_2O_3$ powder had been dispersed was formed by coating. In this case, an injection port necessary in a later preparation step was provided in the epoxy resin layer.

Onto this epoxy resin layer, a Corning 7059 slide glass 1a was bonded by pressing which had been provided on the inside surface with a transparent electrode 2a having a poly(p-xylylene) layer of 2000 Å thick subjected to an orientation controlling treatment. After the epoxy resin was heat-cured sufficiently, the resulting plate and a GH type liquid crystal material were placed in a vacuum chamber, which was then evacuated with a rotary pump to a pressure of $1\times10^{-2}$ Torr. Said injection port was covered with the liquid crystal material to introduced it into the space between the shading layer 5 and the transparent electrode 2a by raising the chamber pressure gradually to an atmospheric pressure. After the space was completely filled, the injection port was sealed with the same epoxy resin. A dispersion of 0.5% by weight of anthraquinone blue dye D5 (mfd. by BDH Chemical Co.) in Nematic Phase 1291 (mfd. by Merck and Co.) was used as the liquid crystal material, which is in the homogeneous alignment state and has a clearing point of 107° C. and a threshold voltage of 2.2 V.

A polarizing film [NPF-Q-12 (neutral gray), mfd. by Nitto Denko Co.] was attached onto the transparent substrate 1a, thus completing the GH type liquid crystal light valve device shown in FIG. 8.

Figure 12:
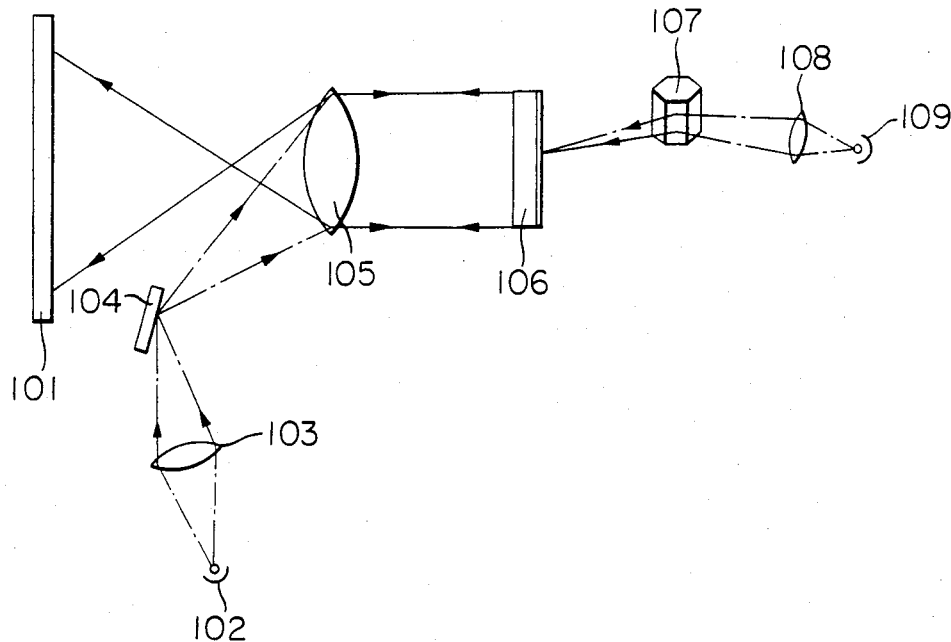
FIG. 12 is an illustration outlining a projection apparatus provided with the present device.

FIG. 12 is a schematic diagram of a projection apparatus equipped with this light valve device, wherein 101 denotes a screen having a white diffuse surface; 102 a halogen lamp for emitting projection light; 103 a lens for condensing the projection light onto a mirror 104; 105 a lens for magnifying a projection image formed in the GH type liquid crystal light valve device 106, onto the screen 101 by a factor of 20; and 107 a polygonal mirror for projecting a He-Ne laser beam to predetermined positions of the photoconductive layer surface in a spot of 100 μmφ, said laser beam being emitted from a writing light source 109 and condensed by a condensing lens 108.

A brief description is given below on results of the formation of a projection image, erasure thereof, and projection of the image on a screen.

A 4.2 V d.c. voltage was applied to the transparent electrodes 2a and 2b so as to make the latter side negative. While driving the polygonal mirror 107, the writing He-Ne laser input beam was projected through the transparent substrate 1b to the photoconductive layer 9. An expected projection image was formed in the GH type liquid crystal layer with a voltage application period of 20 m sec and a writing laser input intensity of 200 μW/cm². This projection image was projected onto the screen with the halogen lamp projection light of intensity 100 mW/cm². The contrast of the image formed on the screen was 6:1 at maximum in terms of reflected light intensity ratio of light portion to dark portion.

The erasure of the projection image was carried out by applying a 1-KHz a.c. voltage of 2 V between the transparent electrodes 2a and 2b for 20 m seconds.

In this case, the reverse direction dark resistivity of the photoconductive layer 9 was $10^{13}$ ohm. cm or more and the forward direction value, though local nonuniformity was present, was $10^8$–$10^9$ ohm.cm.

The poly(p-xylylene) was effective for preventing the ion injection from the transparent electrode 2a or from the shading layer 5 into the liquid crystal layer, to prolong the life of the liquid crystal material.

EXAMPLE 3

Similarly to Example 2, Pt was vacuum-deposited on a transparent electrode 2b laid on a transparent substrate 1b, and a a-Si-H layer 9b was deposited on the Pt layer. Further, a n-layer 9c of 1000 Å thick was deposited on the a-Si-H layer 9b under the following deposition conditions:

$P_B$ (base pressure) $1\times10^{-6}$ Torr; Gas; SiH$_4$/H$_2$ (1:9), (at 2 SCCM) and PH$_3$/H$_2$=100 PPM (at 10 SCCM); Gas pressure 0.1 Torr; Ts (substrate temperature) 200° C.; RF power 8 W; Deposition period 16 minutes.

The resulting n-layer was photo-etched to the same pattern as the reflectors shown in FIG. 3. The band diagram of the photoconductive layer 9 was as shown in FIG. 11A.

On the n-layer 9c, similarly to Example 2, reflectors 8, a light-transmittable insulating layer 7, and a shading layer 5 were formed successively.

A GH type of liquid crystal material was enclosed between the shading layer 5 and a transparent electrode 2a, both being coated previously with a poly(p-xylylene) treated for orientation control, and the latter being deposited previously on a transparent substrate 1a. A polarizing plate 10 was attached onto the transparent substrate 1a, thus completing the liquid crystal light valve device of this Example.

In the same way as in Example 2, an image meeting the writing light input signals was reproduced on screen 101 by using the apparatus of FIG. 12. In the formation of projection image, the voltage applied to the transparent electrodes 2a and 2b was 4.3 V.

The erasure of the projection image was operated under the same conditions as of Example 2, wherein the forward direction dark resistivity of the photoconductive layer was $10^8$ ohm.cm and its local nonuniformity was in a slight degree.

EXAMPLE 4

A p-layer 9a of 100 Å thick was deposited on a transparent electrode [In$_2$(Sn)O$_3$] 2b laid on a transparent substrate (Corning 7059 slide glass) 1b, under the following conditions.

$P_B$ $1\times10^{-6}$ Torr; Source gas: SiH$_4$/H$_2$ (1:9) (at 4 SCCM), B$_2$H$_6$/H$_2$=100 ppm (at 10 SCCM); Gas pressure 0.1 Torr; Ts 250° C.; RF power 10 W; Deposition period 100 seconds.

On the p-layer 9b thus produced, a a-Si-H layer 9b was deposited similarly to Example 2, then a n-layer 9c was deposited and patterned under the same conditions as of Example 3, and reflectors 8, a light-transmittable insulating layer 7, and a shading layer 5 were formed also similarly to Example 2. Further, a GH type of liquid crystal material was enclosed between the shading layer 5 and a transparent electrode 2a, the former being coated previously with a poly(p-xylylene) treated for orientation control. A polarizing plate 10 was attached to the transparent substrate 1a, thus completing the liquid crystal light valve device of this Example.

The band diagram of the photoconductive layer 9 of this device was as shown in FIG. 11B, and the dark resistivity was $10^{13}$ ohm.cm or more for the reverse direction and $10^8$ ohm.cm with a slight local nonuniformity for the forward direction.

In the same way as in Example 2, an image meeting the writing light input signals was reproduced on the screen 101. In the formation of the projection image, the voltage applied to the transparent electrodes 2a and 2b was 4.3 V equally to Example 3. The erasure of projection image can be performed under the same conditions as of Example 2.

EXAMPLE 5

A light-transmittable insulating film 9a of a-Si-N-H of 2000 Å thick was formed on a transparent electrode 2b of In$_2$(Sn)O$_3$ laid on a transparent substrate (Corning 7059 slide glass) 1b, under the same conditions as in the case of preparation of the light-transmittable insulating layer 7 in Example 2. Also similarly to Example 2, a a-Si-H layer 9b was deposited, and under the same conditions as of Example 3, a n-layer 9c was formed and patterned. Thereafter, in the same manner as in Example 2, the GH type liquid crystal light valve device of this Example was completed.

The band diagram of the photoconductive layer of this device was as shown in FIG. 11C, and similarly to Examples 3 and 4, the dark resistivity of the photoconductive layer 9 was $10^{13}$ ohm.cm or more for the reverse direction and $10^8$ ohm.cm with a slight local nonuniformity for the forward direction.

Using the apparatus, as shown in FIG. 12, equipped with this device, an image meeting the writing light input signals was reproduced on the screen 101 in a way similar to Example 2. In the formation of the projection image, the operational voltage was 4.4 V. The erasure of the projection image also can be performed under the same conditions as in the other Examples.

EXAMPLE 6

Referring to FIG. 13 and FIG. 15, this Example is illustrated. Pt was vacuum-deposited on a transparent electrode 2b of In$_2$(Sn)O$_3$ laid on a transparent substrate 1b of Corning 7059 slide glass, by an electron beam process under conditions of $P_B$ (base pressure) $1 \times 10^{-6}$ Torr, rate of deposition (R) 1 Å/S. Ts 80° C., to form a Pt layer 9a of 40 Å thick. A a-Si-H layer 9b was then deposited in the thickness of 15 μm on a slide glass by a capacitive coupling type discharge decomposition process as follows.

In a reaction furnace provided with an anode and a cathode of both 200 mm in diameter distant 50 mm from each other, the slide glass was set on the anode side and a SiH$_4$/H$_2$ (50:50) gas mixture was introduced at the rate of 20 SCCM, $P_B = 1 \times 10^{-6}$ Torr and decomposed by glow discharge under conditions of gas pressure 0.05 Torr, Ts 250° C., RF 13.56 MHz, RF power 15 W, and deposition period 15 hours. The a-Si-H layer thus obtained exhibited a good photoconductivity; $\rho_D$ (dark resistivity) $10^{10}$ ohm.cm, $\rho_L$ (resistivity, when irradiated with a He-Ne laser beam of 1 mW/cm$^2$) $10^5$ ohm.cm, as measured by the surface type fashion with a comb type electrode.

On the a-Si-H layer 9b, Al was deposited in the thickness of 2000 Å by the electron beam vacuum decomposition process under conditions of $P_B$ $1 \times 10^{-5}$ Torr, Ts 60° C., and deposition rate 10 Å/S. The Al deposit was photo-etched into a number of reflectors 8, each 90 μm×90 μm in size, having a pitch of 100 μm (a pattern as shown in FIG. 3).

A light-transmittable insulating layer 7 of a-Si-N-H 3000 Å thick was deposited thereupon as follows: In the reactor used for the above a-Si-H formation, the resulting plate was set on the anode side and a gas mixture SiH$_4$/H$_2$ (1:9) (at 5 SCCM) and pure NH$_3$ gas (at 20 SCCM) were introduced and decomposed under conditions of $P_B$ $1 \times 10^{-6}$ Torr, total gas pressure 0.15 Torr, Ts 250° C., RF power 5 W, and deposition period 5 hours. The a-Si-N-H layer thus obtained had a volume resistivity of $10^{14}$ ohm.cm or more.

Al of 2000 Å thick was deposited on the layer 7 and photo-etched to form a shading layer 5 having a pattern as shown in FIG. 2. In this case, the width of the overlapping portion of the shading layer 5 with the reflector 8 was made to be 5 μm. Consequently, the size of the opening of the hole 6 was 80 μm×80 μm.

Then, an epoxy adhesive was coated on the shading layer 5 with a spiner in the thickness of 1 μm, and thereupon was bonded a 10-μm thick polarizing film (analyser 11) which had been prepared by stretching a film formed from poly(vinyl alcohol) containing iodine dispersed.

On this analyser 11, a poly(p-xylylene) layer of 3000 Å thick was deposited by a gaseous phase thermal decomposition process. The surface of the poly(p-xylylene) was rubbed with a cotton cloth for the liquid crystal orientation controlling purpose.

On the perimeter of the shading layer 5 [the poly(p-xylylene) on this region had been removed], an epoxy resin containing Al$_2$O$_3$ powder dispersed was coated in the thickness of 8 μm, wherein a port necessary to inject a liquid crystal material was provided.

Onto this epoxy resin layer, a Corning 7059 slide glass 1a was bonded by pressing which had been provided on the inside surface with a transparent electrode 2a having a poly(p-xylylene) layer of 2000 Å thick subjected to a orientation controlling treatment.

After the epoxy resin was heat-cured sufficiently, the resulting plate and a TN type liquid crystal material were placed in a vacuum chamber, which was then evacuated to $1 \times 10^{-2}$ Torr. The injection port was covered with the TN type liquid crystal material to introduce it into the space between the shading layer 5 and the transparent electrode 2a by raising the chamber pressure gradually. After the space was completely filled with the TN type liquid crystal, the injection port was sealed with the epoxy resin. The liquid crystal material used is Nematic Phase 1289 (mfd. by Merck and Co.) having a clearing point of 64° C. and a threshold voltage of 1.42 V and exhibiting a twist alignment as illustrated referring to FIG. 14.

A polarizing film (neutral gray; NPF-Q-12 mfd. by Nitto Denko Co.) was attached onto the transparent substrate 1a, thus completing the liquid crystal light valve device of this Example.

A brief description is given below on results of the formation of the projection image, erasure thereof, and projection of image on a screen, these being conducted by using the projection apparatus shown in FIG. 12 in which the liquid crystal light valve device of this Example was incorporated.

A 6.5 V d.c. voltage was applied to the transparent electrodes 2a and 2b so as to make the latter side negative. While driving the polygonal mirror 107, a writing He-Ne laser input beam was projected through the transparent electrode 1b to the photoconductive layer 9. An expected projection image was formed in the liquid crystal layer with a voltage application period 15 m sec and a writing laser input intensity of 200 $\mu W/cm^2$. This projection image was projected onto the screen with the halogen lamp projection light of intensity 100 mW/cm$^2$. The contrast of the image formed on the screen was 10:1 at maximum in terms of reflected light intensity ratio of light portion to dark portion.

The projection image erasure was carried out by applying a 1-KHz a.c. voltage of 3 V between the transparent electrodes 2a and 2b for 20 m seconds. In this case, the dark resistivity of the photoconductive layer 9 was $10^{13}$ ohm.cm for the reverse direction and $10^8$–$10^9$ ohm.cm, though local nonuniformity was present, for the forward direction.

The poly(p-xylylene) on the transparent electrode 2a was effective for preventing the ion injection from this electrode 2a to the liquid crystal layer to prolong the life of the liquid crystal material.

EXAMPLE 7

Similarly to Example 6, Pt was vapor-deposited on a transparent electrode 2b laid on a transparent substrate 1b, and a a-Si-H layer 9b was deposited on the Pt layer. Further, a 1000-Å thick n-layer 9c was deposited on the a-Si-H layer 9b under the following deposition conditions.

$P_B$ $1\times10^{-6}$ Torr; Gas: SiH$_4$/H$_2$ (1:9) (at 2 SCCM) and PH$_3$/H$_2$=100 ppm (at 10 SCCM); Gas pressure 0.1 Torr; Ts 200° C.; RF power 8 W; Deposition period 16 minutes.

The resulting n-layer was photo-etched to the same pattern as the reflectors shown in FIG. 3. The band diagram of the photoconductive layer 9 was as shown in FIG. 11A.

Reflectors 8, a light-transmittable insulating layer 7, a shading layer 5, and an analyser 11 were formed on the n-layer 9c similarly to Example 6.

A TN type of liquid crystal material was enclosed between the analyser 11 and a transparent electrode 2a, the former being coated previously with a poly(p-xylylene) treated for orientation control. A polarizing plate 10 was attached on the transparent substrate 1a, thus completing the liquid crystal light valve device of this Example.

Using the apparatus, shown in FIG. 12, in which this device was incorporated, an image meeting the writing light input signals was reproduced on the screen 101 in the same manner as in Example 6. In the projection image formation, the voltage applied to the transparent electrodes 2a and 2b was 6.7 V.

The erasure of the projection image was operated under the same conditions as of Example 6, wherein the forward direction dark resistivity of the photoconductive layer 9 was $10^8$ ohm.cm and its local non-uniformity was in a slight degree.

EXAMPLE 8

A P-layer 9a of 100 Å thick was deposited on a transparent electrode 2b of In$_2$(Sn)O$_3$ laid on a transparent substrate (7059 slide glass) 1b, under the following deposition conditions.

$P_B$ $1\times10^{-6}$ Torr; Gas: SiH$_4$/H$_2$ (1:9) (at 4 SCCM) and B$_2$H$_6$/H$_2$=100 ppm (at 10 SCCM); Gas pressure 0.1 Torr; Ts 250° C.; RF power 10 W; Deposition period 100 seconds.

On the P-layer 9a thus obtained, a a-Si-H layer 9b was deposited similarly to Example 6, and a n-layer 9c was deposited thereupon and patterned, under the same conditions as of Example 7.

Then, similarly to Example 6, reflectors 8, a light-transmittable insulating layer 7, a shading layer 5, and an analyser 11 were formed.

A TN type of liquid crystal material was enclosed between the analyser 11 and a transparent electrode 2a, the former being overlaid previously with a poly(p-xylylene) treated for orientation control. A polarizing plate 10 was attached onto the transparent substrate 1a, thus completing the liquid crystal light valve device of this Example.

The band diagram of the photoconductive layer 9 of this device was as shown in FIG. 11B, and the dark resistivity of the photoconductive layer was $10^{13}$ ohm.cm or more for the reverse direction and $10^8$ ohm.cm with a slight local nonuniformity for the forward direction.

An image meeting the writing light input signals was reproduced on the screen 101 in the same fashion as in Example 6. In the projection image formation, the operational voltage applied was 6.7 V equally to Example 7. The erasion of projection image can be carried out under the same conditions as of Example 6.

EXAMPLE 9

A light-transmittable insulating layer 9a of a-Si-N-H of 2000 Å thick was formed on a transparent electrode 2b of In$_2$(Sn)O$_3$ laid on a transparent substrate 1b of Corning 7059 slide glass, under the same conditions as used for the formation of the light-transmittable insulating layer 7 in Example 6. Further, similarly to Example 6, a a-Si-H layer 9b was deposited, and under the conditions as of Example 7 a n-layer 9c was formed and patterned. Thereafter, in the same manner as in Example 8, the liquid crystal light valve device of this Example was completed.

The band diagram of the photoconductive layer 9 was as shown in FIG. 11C, and similarly to Examples 7 and 8, the dark resistivity of the photoconductive layer was $10^{13}$ ohm.cm or more for the reverse direction and $10^8$ ohm.cm with a slight local nonuniformity for the forward direction.

Using the apparatus, shown in FIG. 12, in which this device was incorporated, an image meeting the writing light input signals was reproduced on the screen 101. In the projection image formation, the operational voltage applied was 6.7 V. The erasure of the projection image can be carried out under the same conditions as of Example 6.

The present invention, described hereinbefore in detail, can exhibit the following effects:

1. Because the structure of the reflectors in the device is simplified in particular, the whole device is compact as well as the techniques for its production are simplified and the production yield is improved.

2. The device can provide projection images of excellent quality with its simple structure.

3. When the operational voltage is d.c., whereas the prior art device requires the formation of a so-called carrier trap level in its photoconductive layer, the present device does not require separately a carrier trap level since the reflectors are made of a conductor and hence can accept carriers sufficiently, thus less steps being required for the production of the device.

4. Since color filters can be attached to the present device with ease by micro-fabrication techniques, this invention can provide liquid crystal light valve devices for color displays having a high resolving power.

5. According to this invention, displays taking advantage of electro-optical effects are possible by d.c. operation and dynamic image displays are easy in such cases.

6. The range of operational voltage is wide and the control of operational voltage is easy.

7. When projection images are formed, the image quality is stable over the whole display surface.

8. The device has a long life.

9. The reflector elements can accept photo-carriers in d.c. voltage operation.

10. Since color filters can be disposed with ease on the openings of the shading layer, this can be utilized for multicolor displays.

11. The projection image has a memory action.

What I claim is:

1. An electro-optical device for converting a light input image into a projection image by a photoelectric effect, said device comprising: (A) a liquid crystal layer; (B) a photoconductive layer, including a base layer of at least one of vacuum-deposited Pt, Pd, Au, and Mo, an i-layer, and an n-layer; (C) a shading layer having a plurality of holes therein corresponding to picture elements; (D) a plurality of reflectors, separate from one another, each facing one of said holes; and (E) a light-transmitting insulating layer in contact with said shading layer; said shading layer, said plurality of reflectors, and said insulating layer lying between said liquid crystal layer and said photoconductive layer.

2. An electro-optical device for converting a light input image into a projection image by a photoelectric effect, said device comprising: (A) a photoconductive layer including a base layer of at least one of vacuum deposited Pt, Pd, Au, and Mo, an i-layer, and an n-layer; (B) a liquid crystal layer; (C) an analyser; (D) a shading layer having a plurality of holes therein corresponding to picture elements; (E) a plurality of reflectors, separate from one another, each facing one of said holes; and (F) a light-transmitting insulating layer in contact with said shading layer; said shading layer, said plurality of reflectors, and said insulating layer lying between said liquid crystal layer and said photoconductive layer.

3. An electro-optical device according to claim 1 in which a color optical filter is provided in at least one hole in said shading layer.

4. An electro-optical device according to claim 1 or 2 in which the area of each reflector is larger than that of the hole in said shading layer that it faces.

5. An electro-optical device according to claim 1 or 2 in which the width of the area overlapping in the direction perpendicular to the surfaces of said reflectors between said reflectors and said shading layer is larger than the thickness of said light-transmitting insulating layer present between said reflectors and said shading layer.

6. An electro-optical device according to claim 1 or 2 in which the side of shading layer facing said reflectors is light absorptive.

7. An electro-optical device according to claim 1 or 2, further comprising two counter electrodes, said liquid crystal layer and said photoconductive layer being disposed between counter electrodes, at least one of said counter electrodes comprising plural stripes of electrodes separate from one another.

8. A method of operating an electro-optical device, provided with both a liquid crystal layer and a photoconductive layer including a base layer of at least one of vacuum-deposited Pt, Pd, Au, and Mo, an i-layer, and an n-layer, for converting a light input image into a projection image by a photoelectric effect, said method comprising: (A) a step of forming a projection image with the liquid crystal layer by applying d.c. voltage in the reverse direction of rectification by the photoconductive layer and irradiating the photoconductive layer with writing light input signals, and (B) a step of erasing the projection image by applying a voltage in the forward direction of rectification by the photoconductive layer.

9. An electro-optical device according to claim 1 or 2 wherein said i-layer has a weak nature of an n-type of semiconductor.

10. An electro-optical device according to claim 9 wherein said semiconductor comprises a hydrogen-containing amorphous silicon.

11. An electro-optical device according to claim 1 or 2 wherein said base layer has a thickness of from 20 Å to 500 Å.

12. An electro-optical device according to claim 1 or 2 wherein the thickness of said i-layer is in the range of 5000 Å to 20 μm.

13. An electro-optical device according to claim 1 or 2 wherein the thickness of said n-layer is in the range of 100 Å to 3000 Å.

* * * * *

UNITED STATES PATENT AND TRADEMARK OFFICE
CERTIFICATE OF CORRECTION

PATENT NO. : 4,538,884

DATED : September 3, 1985

INVENTOR(S) : Tatsuo Masaki

It is certified that error appears in the above-identified patent and that said Letters Patent is hereby corrected as shown below:

Column 8, line 34, "conered" should read -- covered --.

Column 15, line 56, delete "to be".

Column 20, line 61, "the" should read -- a --.

Signed and Sealed this

Twenty-ninth Day of April 1986

[SEAL]

Attest:

DONALD J. QUIGG

Attesting Officer

Commissioner of Patents and Trademarks